UNITED STATES PATENT OFFICE.

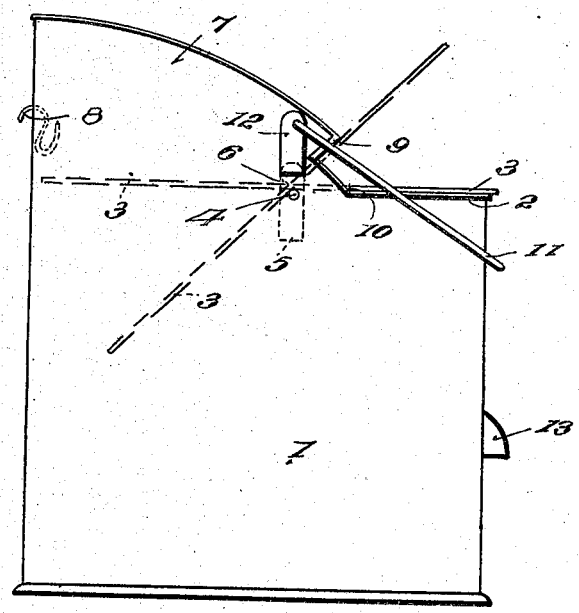
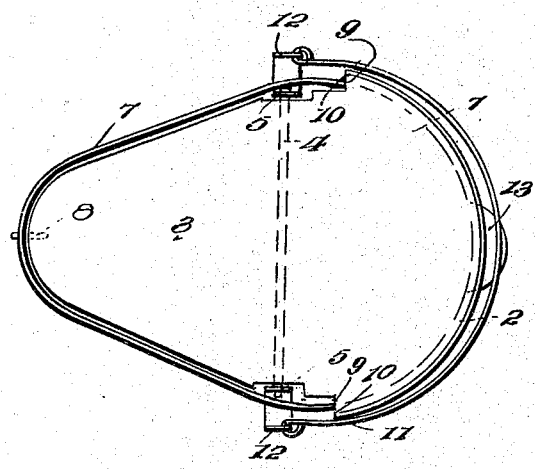
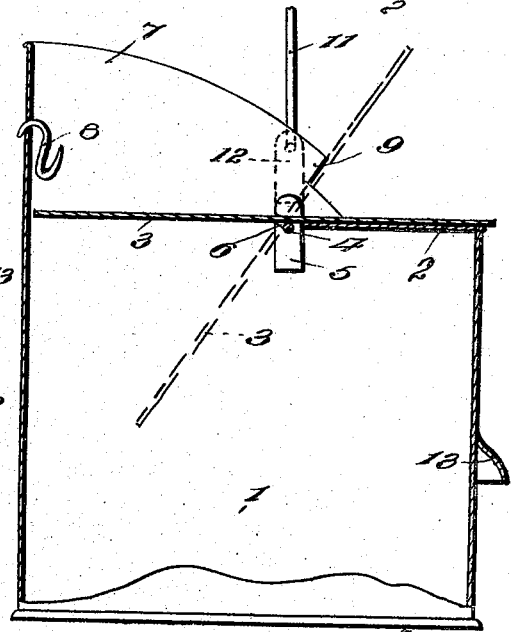

OSCAR F. LUND, OF MOLINE, ILLINOIS.

ANIMAL-TRAP.

No. 894,962.  Specification of Letters Patent.  Patented Aug. 4, 1908.

Application filed March 6, 1908. Serial No. 419,545.

*To all whom it may concern:*

Be it known that I, OSCAR F. LUND, citizen of the United States, residing at Moline, in the county of Rock Island and State of Illinois, have invented certain new and useful Improvements in Animal-Traps, of which the following is a specification.

The present invention provides a trap for catching rats, mice and like animals and which is ever set and automatic in operation and preventing the escape of the rodents when trapped.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a side view of a trap embodying the invention. Fig. 2 is a top plan view of the trap. Fig. 3 is a vertical central section of the trap.

Corresponding and like parts are referred to in the following description and indicated in all the views of the drawings by the same reference characters.

The body of the trap comprises a receptacle 1 which may be of any size according to the particular purpose for which the trap is designed. A shelf 2 extends over the upper portion of one part of the receptacle and serves the double function of a stop to limit the movement of the tilting platform in one direction and also to prevent operation of said platform by the entrapped animals in an attempt to escape. A platform 3 has pivotal connection about midway of its ends with opposite sides of the receptacle so as to tilt or move downward at one end. The axis of said platform is indicated at 4 and may consist of a rod secured to the platform in any manner and having opposite ends mounted in ears 5 projected vertically from opposite sides of the receptacle. Ears 5 may form a part of the receptacle or may be secured thereto in any manner. Inclined slots 6 extend from the openings of the ears in which the rod 4 obtains a bearing, said slots inclining outwardly and upwardly through corresponding edges of the ears, thereby permitting of the platform 3 being readily removed from the receptacle and quickly replaced when required. The end portion of the platform arranged to tilt forward corresponds to the front of the trap, whereas the opposite end of the platform adapted to overlap the shoulder 2 and to move upward, is the rear end or portion.

The rear portion of the body or receptacle 1 is made rounding, whereas the front portion is contracted so that in horizontal section the receptacle is approximately of pear-form. A guard 7 projects vertically from the front portion of the receptacle and its upper edge slopes rearwardly, said guard inclosing the front portion of the platform 3 so as to prevent the escape of an animal after the platform has started to tilt under the weight of the animal resting thereon. A hook 8 is applied to the front portion of the guard 7 upon the inner side and is adapted to receive an appropriate bait. The front portion of the guard 7 is highest so as to prevent the animal from leaping forward and escaping when the platform is tilting. Shoulders 9 are formed at the rear ends of the side portions of the guard 7 and form stops to engage with the rear portion of the platform 3 and limit the tilting thereof. The platform is cut away at opposite edges to form extensions 10 which coöperate with the stop shoulders 9 to limit the tilting of the platform.

For convenience of carrying the trap, a bail 11 is provided and pivoted at its ends to ears 12 applied to opposite sides of the receptacle, said ears being independent of the ears 5 and in transverse alinement therewith and having their upper portions projected outward from the sides of the receptacle so as to prevent interference of said ears and bail with the free movements of the platform. A hand piece 13 is fitted to the rear side of the receptacle for convenience of tilting the same to dump any water or object that may be received in the trap.

In the operation of the trap, the receptacle may be supplied with water to any depth, so that the entrapped animal may be drowned. However, the receptacle may be free from liquid and the entrapped animals disposed of in any desired way.

Having thus described the invention, what is claimed as new is:

1. A self-set animal trap comprising a receptacle, a shelf extended over the rear portion of the receptacle, a tilting platform arranged to have its rear portion overlap the said shelf and to have its front portion enter the receptacle when tilting, said platform having extensions at opposite edges, and a guard projected upward from the front portion of the receptacle and encircling the front portion of the platform and having stop shoulders at its rear end to engage with the aforesaid extensions of the platform and limit the tilting of the latter.

2. The herein described self-set animal trap comprising a receptacle of approximately pear-form in horizontal section, the contracted portion being arranged to the front, a shelf extended over the enlarged rear portion of the receptacle, ears provided with openings and projected upward from opposite sides of the receptacle, and a tilting platform mounted in said ears, the latter having upwardly inclined slots extended from the openings in which said platform obtains a mounting, a guard projected upward from the contracted portion of the receptacle and having stop shoulders at its rear end, other ears projecting upward from opposite sides of the receptacle and having their upper portions clearing the platform, and a bail pivoted to the last mentioned ears.

In testimony whereof I affix my signature in presence of two witnesses.

OSCAR F. LUND. [L. S.]

Witnesses:
 HEINERICK SCHNEEKLOTH,
 JOHN A. SCHMIDT.